Dec. 23, 1947.   B. G. FORMAN   2,432,986
NON-CONDUCTIVE FASTENER
Filed May 1, 1945
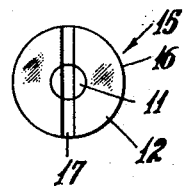
FIG.3
FIG.1
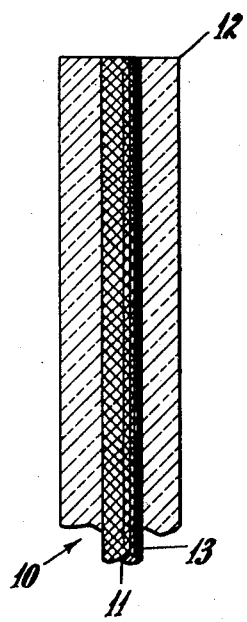
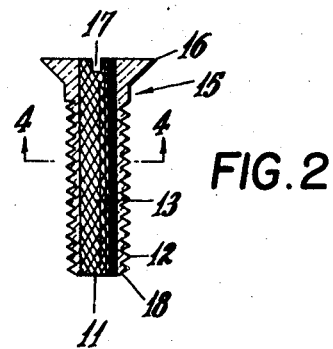
FIG.2
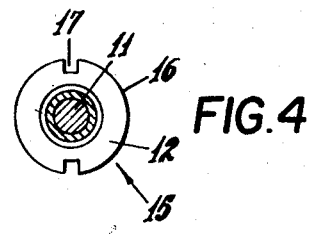
FIG.4
BENJAMIN G. FORMAN
*INVENTOR.*
BY Joseph Blacker
*ATTORNEY*

Patented Dec. 23, 1947

2,432,986

UNITED STATES PATENT OFFICE 2,432,986

NONCONDUCTIVE FASTENER

Benjamin G. Forman, Brooklyn, N. Y.

Application May 1, 1945, Serial No. 591,282

2 Claims. (Cl. 174—138)

This invention relates to threaded fastening devices having an exterior of plastic or other non-conductive material and having means centrally thereof for augmenting the tensional strength of the outer material against breaking under stress.

An object of this invention is to provide a composite threaded fastener having a serrated metal core in its central portion, the serrations extending throughout the length of the core, whereby the core is united in permanent union with the outer material throughout its length.

Another object of this invention is to provide a composite threaded fastener having a slotted end and the core at the slotted end being of the same diameter as the body of the core.

Another object of this invention is to provide an elongated non-conductive composite bar having a metal core throughout its length and having an outer covering of plastic or non-conductive material, the inner and outer materials being united in intimate permanent union such as by serrating the entire outer surface of the core and causing the outer covering to be fixedly held in position by the serrations.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a central cross-sectional view of a non-conductive composite bar having an externally insulated metal core and from which bar the threaded fasteners are fabricated.

Figure 2 is a central cross-sectional view of a screw made from the composite bar shown in Figure 1.

Figure 3 is a plan view of the screw shown in Figure 2.

Figure 4 is a cross-sectional view, the section being taken as on line 4—4 in Figure 2.

In the illustrated embodiment of the invention shown in Figures 1 to 4 inclusive, the numeral 10 indicates an elongated composite non-conductive bar having a metal core 11 throughout its length. The bar 10 has an outer covering layer 12 of non-conductive plastic material.

As best shown in Figures 1 and 2, the metal core 11 has serrations 13 throughout its length, the metallic serrations being imbedded into the outer covering layer 12 and designed so that the outer and inner materials are united in intimate permanent union. As shown in Figure 2, it is to be noted that the serrations 13 are formed by intersecting means forming localized surface serrations. It is these localized serrations which are imbedded into the outer covering layer and form localized bonding grips. At every portion of the plastic layer there are reinforcing metallic bonding grips, because both layers are of equal length.

Figures 2 to 4 inclusive show a threaded fastener 15 made from the composite bar 10. In the embodiment shown the fastener 15 has a flat head 16 which is slotted at 17. The fastener 15 has a thread 18 on its outer periphery.

In practice I have found that when a threaded member or screw is made as shown in the drawings, that the union of the inner and outer members is such that not only is the outer covering of plastic material prevented from tearing apart lengthwise of the thread but that under twisting conditions the outer plastic material does not become separated from the inner metal core.

Under extreme service conditions the bond between the inner and outer layers is so strong as to prevent stretch or twist of the outer plastic material beyond its elastic limit and thus preventing the outer plastic layer from fracturing or tearing apart. As shown in Figures 1 and 2, it will be seen that the serrations 13 are angularly directed with respect to the horizontal and vertical axes; that is the serrations are multi-directional.

As shown in Figure 2, it will be seen that the diameter of the metal core 11 is substantially one-half the diameter of the body 12 of the screw 15. Inasmuch as it is well known that steel has a compressive strength many times that of plastic material it follows that the metal core has sufficient strength to absorb the stress developed by a driving means, such as a screw driver, without undue stressing or breaking the outer plastic layer.

In accordance with the patent statutes I have described and illustrated the preferred embodiment of my invention, but it will be understood that various changes and modifications can be made therein without departing from the spirit of the invention as defined by the appended claims.

I claim:

1. A composite screw comprising a plastic non-conductive outer layer, and a solid reinforcing metal core serrated throughout the length of said screw whereby localized multi-directional bonding grips for said non-conductive outer layer are formed, said outer layer being spirally threaded, said materials having their contacting surfaces inseparably joined by imbedding said serrations into the entire length of said outer layer, said metal core and said plastic outer layer being co-extensive.

2. A composite screw comprising a plastic non-conductive outer layer and a solid reinforcing metal core serrated along the length of said screw whereby localized bonding grips for said non-conductive outer layer are formed, said outer layer being spirally screw threaded on its outer surface, said materials having their contacting surfaces inseparably joined by imbedding said serrations into said outer layer, one end of said screw having a head formed with means for engaging and driving said screw, said metal core and said plastic outer layer being co-extensive, said metal core extending through said head to the outer end face thereof so as to be engageable by said driving means, whereby said driving means imparts the stress developed thereby directly to said core.

BENJAMIN G. FORMAN.

REFERENCES CITED

The following references are of record in the file of this patent:

UNITED STATES PATENTS

| Number | Name | Date |
|---|---|---|
| 2,145,744 | Whitney | Jan. 31, 1939 |
| 855,261 | Steinberger | May 28, 1907 |
| 2,318,415 | Patzschke et al. | May 4, 1943 |
| 855,471 | Mix | June 4, 1907 |
| 1,584,524 | Fisher | May 11, 1926 |
| 1,801,937 | Rathbun | Apr. 21, 1931 |
| 63,206 | Brooks | Mar. 26, 1867 |
| 294,384 | Hale | Mar. 4, 1884 |
| 757,765 | Osborne | Apr. 19, 1904 |
| 2,008,227 | Reilly | July 16, 1935 |
| 1,102,252 | Ellis | July 7, 1914 |
| 2,187,135 | Meisse | Jan. 16, 1940 |
| 2,387,630 | Weakley | Oct. 23, 1945 |

FOREIGN PATENTS

| Number | Country | Date |
|---|---|---|
| 354,350 | Great Britain | 1931 |